US010730696B2

(12) United States Patent
Moulin et al.

(10) Patent No.: US 10,730,696 B2
(45) Date of Patent: Aug. 4, 2020

(54) ORDER PICKING SYSTEM

(71) Applicant: EXOTEC SOLUTIONS, Lille (FR)

(72) Inventors: Romain Moulin, Paris (FR); Renaud Heitz, Paris (FR)

(73) Assignee: EXOTEC SOLUTIONS, Lille (FR)

( * ) Notice: Subject to any disclaimer, the term of this patent is extended or adjusted under 35 U.S.C. 154(b) by 169 days.

(21) Appl. No.: 15/768,269

(22) PCT Filed: Oct. 9, 2016

(86) PCT No.: PCT/FR2016/052609
§ 371 (c)(1),
(2) Date: Apr. 13, 2018

(87) PCT Pub. No.: WO2017/064401
PCT Pub. Date: Apr. 20, 2017

(65) Prior Publication Data
US 2018/0305122 A1    Oct. 25, 2018

(30) Foreign Application Priority Data

Oct. 13, 2015 (FR) ...................................... 15 59698

(51) Int. Cl.
*B65G 1/04* (2006.01)
*B65G 1/02* (2006.01)
*B65G 1/137* (2006.01)

(52) U.S. Cl.
CPC ............. *B65G 1/0492* (2013.01); *B65G 1/02* (2013.01); *B65G 1/0485* (2013.01); *B65G 1/1378* (2013.01)

(58) Field of Classification Search
CPC ...... B65G 1/02; B65G 1/0492; B65G 1/0485; B65G 1/1378
See application file for complete search history.

(56) References Cited

U.S. PATENT DOCUMENTS

| 4,515,235 A | 5/1985 | Yamamoto et al. |
| 5,288,059 A | 2/1994 | Gautheron et al. |
(Continued)

FOREIGN PATENT DOCUMENTS

| DE | 9320592 U1 | 1/1995 |
| EP | 1348646 A2 | 10/2003 |
(Continued)

OTHER PUBLICATIONS

French Search Report and Written Opinion dated Jun. 6, 2016 for corresponding French Application No. 1559698, filed Oct. 13, 2015.
(Continued)

*Primary Examiner* — Saul Rodriguez
*Assistant Examiner* — Ashley K Romano
(74) *Attorney, Agent, or Firm* — David D. Brush; Westman, Champlin & Koehler, P.A.

(57) ABSTRACT

An order picking system includes an automated guided trolley with at least two rolling wheels for taking objects of an order from at least one rack and two posts. The automated guided trolley includes climbing elements, which are adapted to cooperate with the posts so as to enable the trolley to rise along the post and prevent the tilting of the trolley, and which includes at least one counter-wheel intended to roll on one of the posts, mounted on a movable bracket.

9 Claims, 8 Drawing Sheets

(56) References Cited

U.S. PATENT DOCUMENTS

| | | | |
|---|---|---|---|
| 7,101,139 | B1 | 9/2006 | Benedict |
| 7,381,022 | B1 | 6/2008 | King |
| 10,457,483 | B2* | 10/2019 | DeWitt ................ B65G 1/0492 |
| 2009/0224133 | A1 | 9/2009 | Gass et al. |
| 2011/0094854 | A1 | 4/2011 | Hayduchok |
| 2012/0003993 | A1 | 1/2012 | Leino et al. |
| 2012/0039693 | A1 | 2/2012 | Benedict et al. |
| 2012/0185082 | A1* | 7/2012 | Toebes ................ B65G 1/0492 700/218 |
| 2012/0189410 | A1* | 7/2012 | Toebes ................ B65G 1/0492 414/273 |
| 2012/0207580 | A1 | 8/2012 | Nave et al. |
| 2014/0031972 | A1 | 1/2014 | Dewitt et al. |
| 2014/0257555 | A1 | 9/2014 | Bastian et al. |
| 2014/0288696 | A1* | 9/2014 | Lert .................... B65G 1/0492 700/216 |
| 2016/0207710 | A1* | 7/2016 | Conrad ................ B65G 1/0485 |
| 2016/0280461 | A1 | 9/2016 | Geiger et al. |
| 2016/0355337 | A1* | 12/2016 | Lert .................... B65G 1/0478 |
| 2017/0101263 | A1 | 4/2017 | Schroer |
| 2017/0174431 | A1* | 6/2017 | Borders ................ B65G 65/00 |
| 2017/0334644 | A1* | 11/2017 | Otto .................... B65G 1/0492 |
| 2019/0023492 | A1* | 1/2019 | Voloskov ............ B65G 1/0492 |
| 2019/0210802 | A1* | 7/2019 | Ueda .................... B65G 1/0407 |
| 2019/0329978 | A1* | 10/2019 | Li ........................ B65G 1/10 |

FOREIGN PATENT DOCUMENTS

| | | |
|---|---|---|
| FR | 2574039 A1 | 6/1986 |
| JP | H0811712 A | 1/1996 |
| JP | 2004249895 A | 9/2004 |
| JP | 2007283958 A | 11/2007 |
| TW | 474885 B | 2/2002 |
| WO | 2010100513 A2 | 9/2010 |
| WO | 2014166640 A2 | 10/2014 |
| WO | 2015070841 A1 | 5/2015 |

OTHER PUBLICATIONS

French Search Report and Written Opinion dated Mar. 22, 2017 for French Application No. 1659919.

Office Action dated Jul. 19, 2019 for corresponding U.S. Appl. No. 15/768,261, filed Apr. 13, 2018.

International Search Report dated Jan. 19, 2017, for corresponding International Application No. PCT/FR2016/052650, filed Oct. 13, 2016.

English translation of the Written Opinion of the International Searching Authority dated Jan. 19, 2017, for corresponding International Application No. PCT/FR2016/052650, filed Oct. 13, 2016.

International Search Report dated Jan. 5, 2017, for corresponding International Application No. PCT/FR2016/052609, filed Oct. 9, 2016.

English translation of the Written Opinion of the International Searching Authority dated Jan. 5, 2017, for corresponding International Application No. PCT/FR2016/052609, filed Oct. 9, 2016.

Notice of Allowance dated Feb. 10, 2020 from corresponding U.S. Appl. No. 15/768,261, filed Apr. 13, 2018.

* cited by examiner

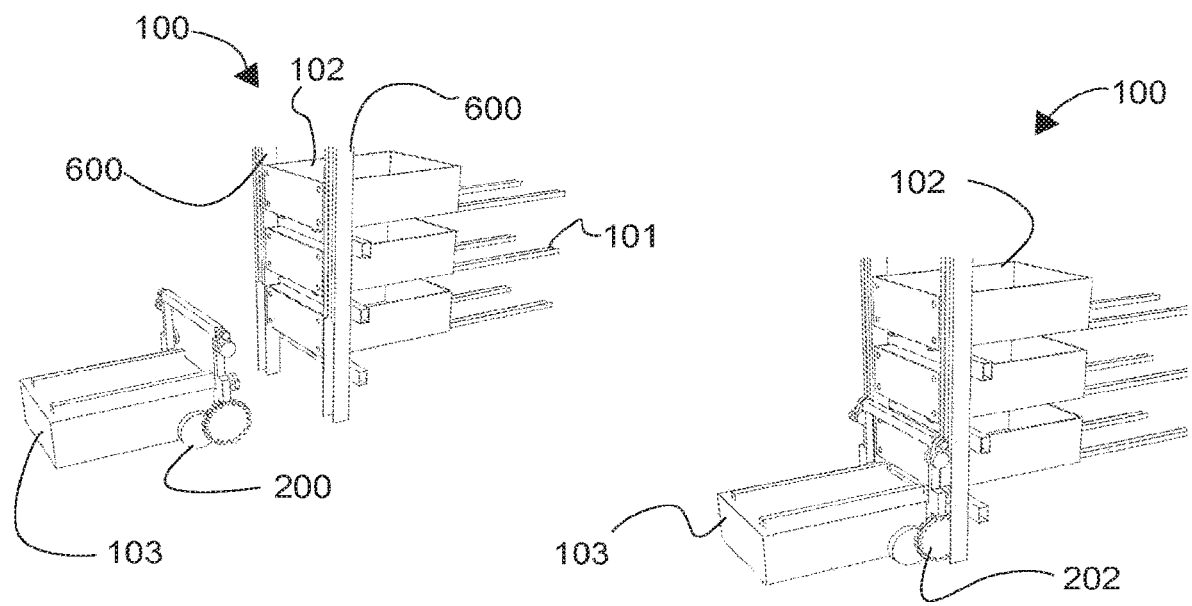
FIG. 5A
FIG. 5B
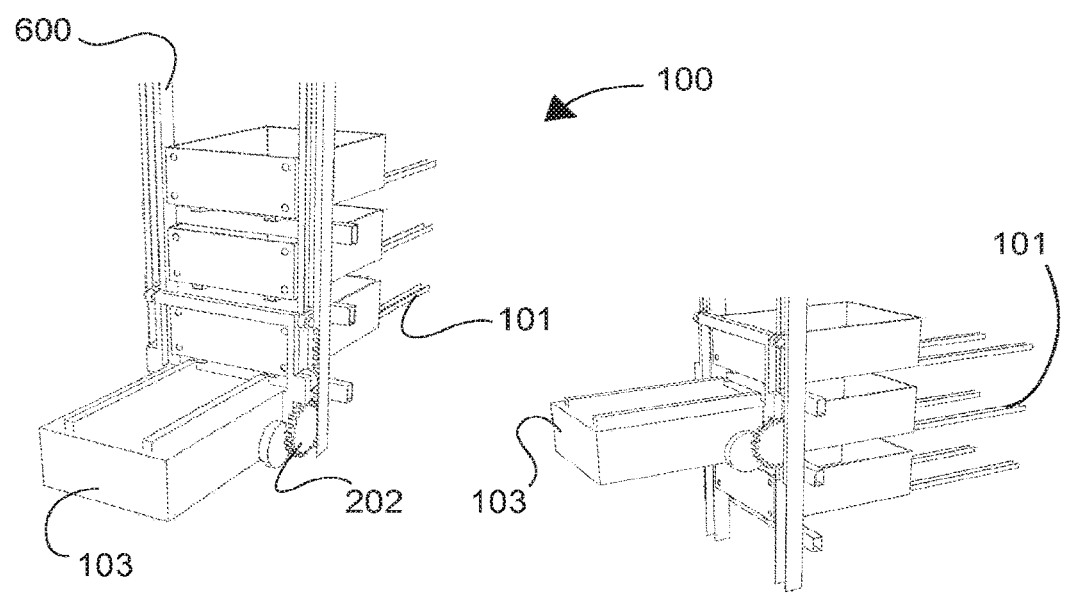
FIG. 5C
FIG. 5D

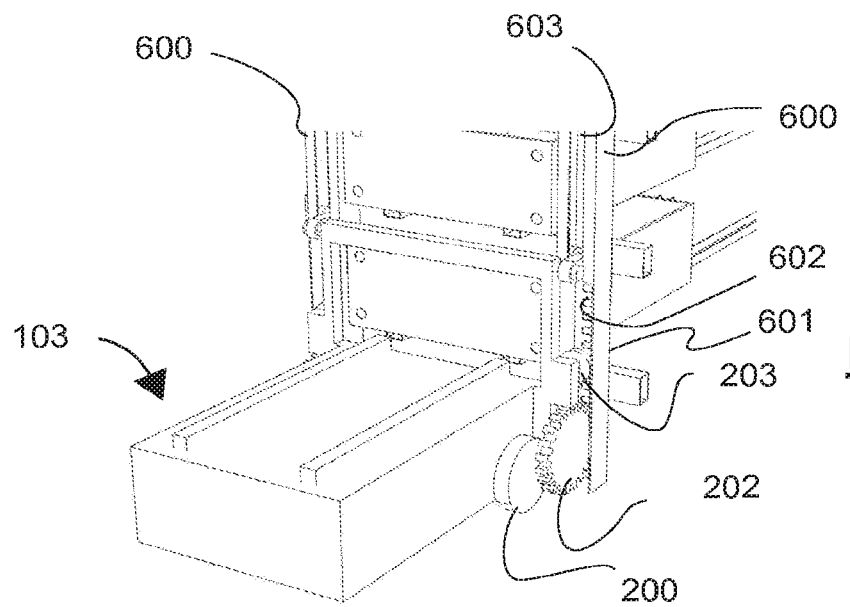
FIG. 6
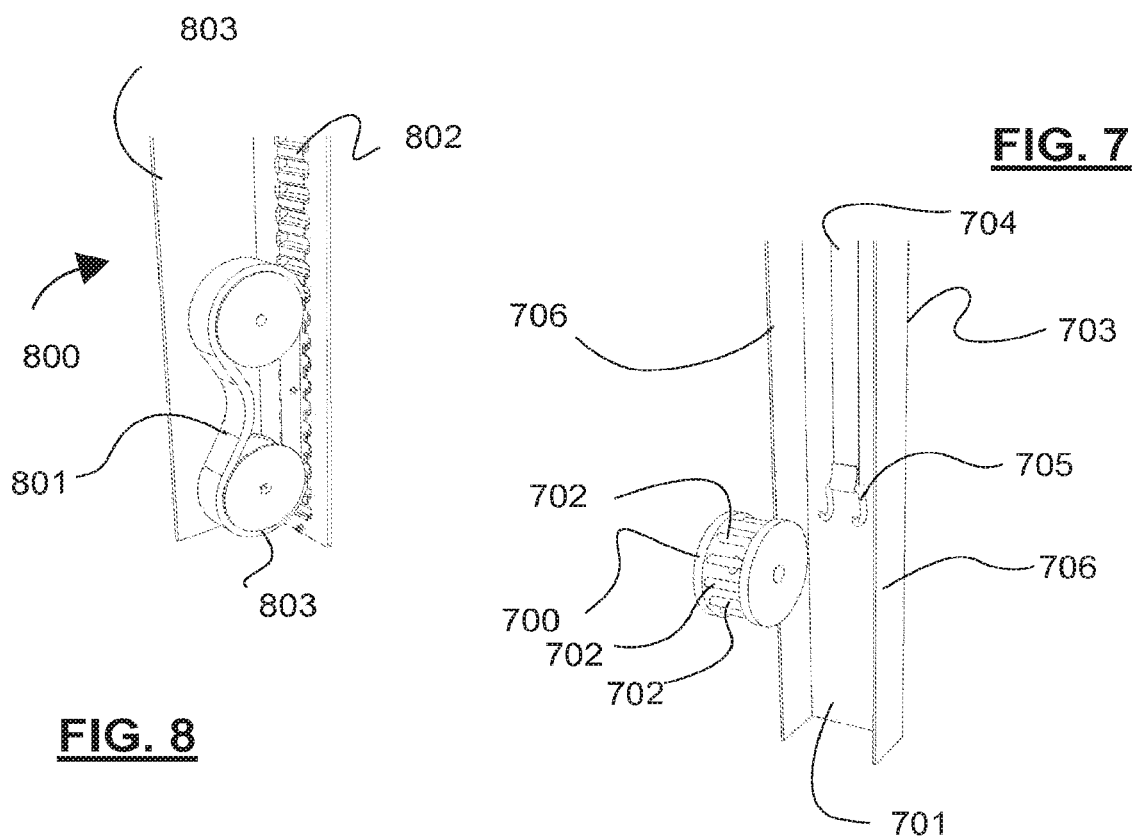
FIG. 7
FIG. 8

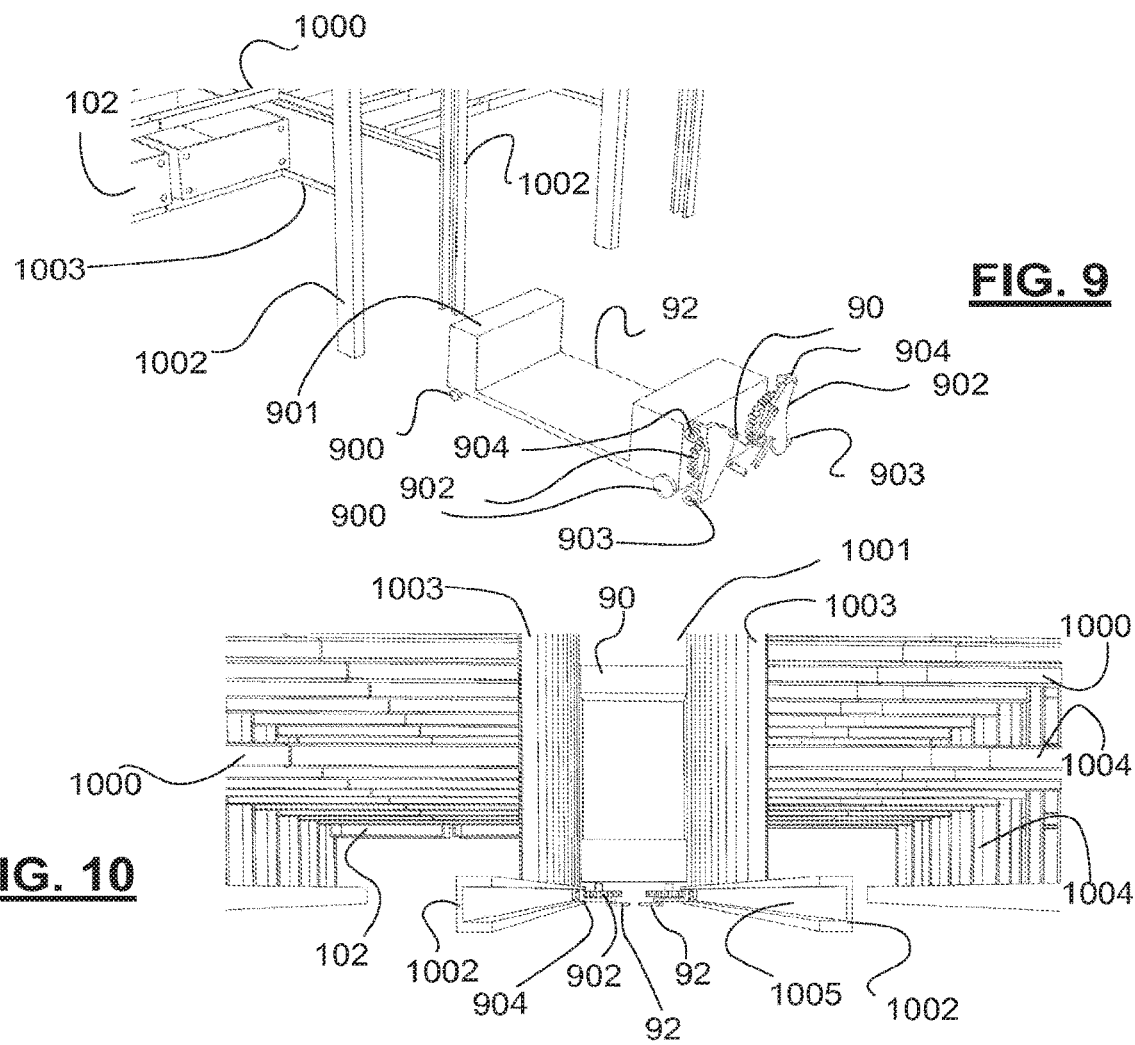
FIG. 9
FIG. 10
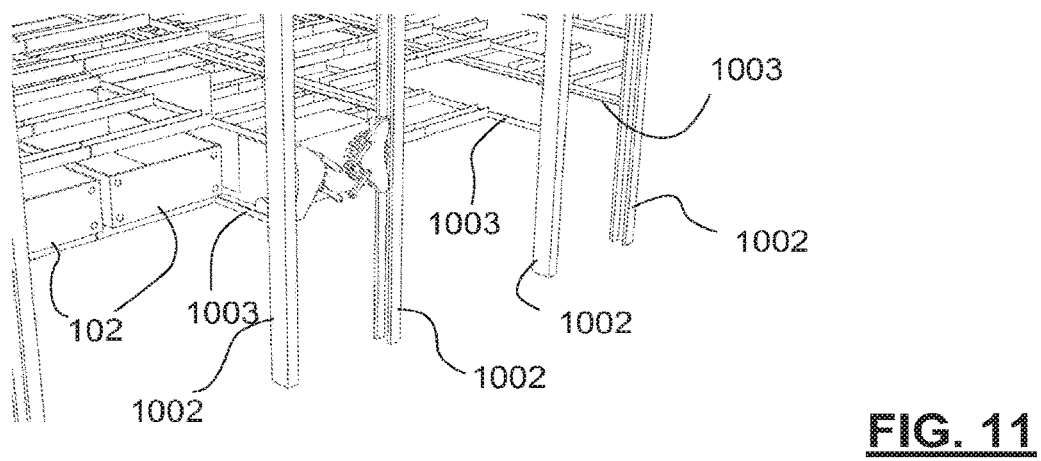
FIG. 11

ORDER PICKING SYSTEM

1. CROSS-REFERENCE TO RELATED APPLICATIONS

This Application is a Section 371 National Stage Application of International Application No. PCT/FR2016/052609, filed Oct. 9, 2016, the content of which is incorporated herein by reference in its entirety, and published as WO 2017/064401 on Apr. 20, 2017, not in English.

2. FIELD OF THE INVENTION

The field of the invention is that of warehouse logistics and in particular the handling and transport of parts or products.

More specifically, the invention relates to an order picking system.

The invention finds application in the automation of the flow management of a warehouse, for example in an order picking warehouse of a supply chain.

3. STATE OF THE ART

In the global supply chain, flow management and product handling within a warehouse play a key role.

Traditionally, an order picker moves into the warehouse to collect each product from an order at its location on a rack shelf.

It is noted that such an organisation implies that the picker travels long journeys during a working day, which causes fatigue and waste of time when the journey is not optimised.

Another disadvantage is that the picker must be familiar with the layout of the warehouse in order not to waste time.

To reduce fatigue due to travel, improve the management of picking, reduce order preparation time and its cost, an organisation of warehouses has been suggested wherein products are conveyed by machines up to order picking positions.

Thus, it has been proposed to use conveyors to transport the products from the shelves to the preparation stations, within a warehouse.

A disadvantage of this known technique is that it requires a heavy and expensive infrastructure.

Another disadvantage of this technique is that it is complex and expensive to evolve.

Another disadvantage is that the conveyors are bulky, resulting in a loss of valuable storage area.

Also known is a technique of moving horizontally along a rack, a mast supporting an elevator that reaches each level of the rack, to collect or deposit a tray.

A disadvantage of this technique is that it is necessary to consider installing a mast for each rack in the warehouse.

Another disadvantage of this known technique is that it is necessary to provide one or more conveyors at the end of each row of racks to transport the trays taken by the masts towards the order picking area.

On a similar principle, there is a known technique of using self-guided shuttles moving on traffic lanes, formed of rails, arranged on several levels, each at the height of a shelf of a rack. To change the level, shuttles use a dedicated elevator at the end of the rack. When a shuttle has taken a tray from a shelf, it drops it down on a conveyor at the foot of the rack.

A disadvantage of this known technique is that the shuttles cannot move from one rack to another, which requires to provide a large number of shuttles.

Another disadvantage of this technique is that there must be traffic lanes and conveyors, which is expensive.

Another disadvantage of this technique is that the shuttles must wait until the elevator is released to access the conveyor, which slows down the preparation of orders.

In a variation, and to reduce the number of traffic lanes, it has been imagined to move an elevator on a traffic lane, to allow the shuttles to reach a few shelves above the level of the traffic lane.

A disadvantage of this variation is that it is even more expensive and complex to implement.

It has also been proposed to transport racks placed in the warehouse to a picking zone using robots. For this, a robot is placed under the rack and raises it for transporting purposes.

A disadvantage of this known technique is that the storage volume is limited in height, to avoid the tilting of the shelves during transport.

To increase the volume stored in a warehouse, it has also been thought to store the goods directly in trays stacked in height and grouped on a storage area.

Robots circulating at the top of the storage volume are used to extract the trays containing the objects or goods of an order. When a robot must take a tray that is not stored on the upper level, the robot removes successively, one after another the trays located above this tray. During this operation, the robot replaces each tray removed from an empty slot on the surface of the storage volume.

A disadvantage of this technique is that the robots handle each time a large amount of trays to extract a single tray, which slows down the preparation of the order.

Also known, for example from U.S. Pat. No. 7,101,139 or US-A1-2012/003993, a robot equipped with two retractable toothed wheels on each side of its chassis, intended to mesh with vertical racks attached to racks, allowing it to rise between two racks to access the trays in which objects to be removed are stored or up to the level of a motor vehicle to move down a car parking space on racks.

A disadvantage of this known robot technique equipped with four retractable toothed wheels is that the robot can remain blocked during the ascent or descent, if the progression in height of one of the four toothed wheels on the racks is not perfectly identical at every moment to that of the other toothed wheels.

4. SUMMARY OF THE INVENTION

An order picking system comprises two posts secured to two separate racks and an automated guided trolley having at least two rolling wheels, intended for removing objects of an order in at least one of said racks and motorised climbing means adapted to cooperate with said posts so as to allow said trolley to rise along said posts, said climbing means comprising two toothed wheels and/or two notched belts of substantially parallel axes, each intended to cooperate with one of said two posts, the axes of the toothed wheels and/or the axes of the pulleys driving said notched belts being substantially orthogonal to the axes of the rolling wheels, each of said posts having a plurality of notches extending substantially perpendicularly to the longitudinal axis of said post, intended to accommodate the teeth of said toothed wheel or of said notched belt cooperating with this post and spaced from the value of the pitch of said toothed wheel or of said notched belt, each of the toothed wheels or notched belts being mounted on a movable bracket relative to the frame of said trolley between two positions:
a spaced apart position in which at least a part of said toothed wheel or said notched belt mounted on said bracket projects laterally out of alignment from said frame;
a retracted position, in which the toothed wheel or the notched belt mounted on said bracket is opposite said frame.

The invention therefore relates to a system that limits human intervention only to placing the goods ordered into cardboard boxes, with at least one automated guided trolley that picks the objects ordered in the racks and which carries these objects up to an order picking area where an operator places these objects in cardboard boxes.

This trolley is advantageously configured so as to be able to climb, that is to say to mount by clinging, on a post to rise in front of a rack or along it, if the post is a post fixed on or integrated with the rack.

Furthermore, the climbing means allow the trolley to remain constantly in engagement with the post(s) during its ascent or descent and maintain the trolley substantially horizontal, which prevents the tray or the object carried by the trolley from falling.

The two movable brackets further allow the trolley to slip between two posts when the movable brackets are retracted, then by moving the movable brackets, to climb along the posts.

Note that the two posts are advantageously secured to two separate racks, so as to allow the trolley to climb astride these two racks.

According to the invention, said climbing means comprise means for preventing the tilting of said trolley comprising at least one counter-wheel intended to roll on one of said posts, mounted on one of said brackets.

Thus, the frame of the trolley does not tilt and remains perfectly horizontal, which prevents it from blocking between the posts during an ascent or a descent.

Preferably, said climbing means comprise two and only two toothed wheels and/or two and only two notched belts.

Thus, the risks of the trolley being blocked between the posts are limited.

According to a particular embodiment of the invention, the post is a C-profiled rail.

According to a particular embodiment of the invention, the post is a U-profiled rail.

According to a particular embodiment of the invention, said posts are posts of two separate racks, so as to allow the trolley to climb astride these two racks.

According to a particular embodiment of the invention, an order picking system as described above comprises means for fixing said posts to said racks.

In a particular embodiment of the invention, the posts are fixed to the ground near one or more racks.

Preferably, said trolley has means for gripping an object storage tray.

The trolley can collect or deposit autonomously a tray on the shelf of a rack in its storage location without external intervention, especially without human intervention.

Such gripping means may comprise, for example, a telescopic shovel, telescopic side arms and/or a telescopic fork equipped with a finger to push or pull a tray.

According to a particular embodiment of the invention, at least one of the rolling wheels and the motorised climbing means are driven by the same motor.

This provides a particularly simple system to implement.

According to an advantageous embodiment of the invention, an order picking system as described above comprises means for braking the climbing means.

Thus the descent of the trolley is secured when it fails, and in particular when the electric battery supplying the engines climbing means is discharged.

Braking can in a particular embodiment of the invention be of the "viscous" type and obtained by magnetic braking, by shunting the armature of the motor.

According to a particular embodiment of the invention, one of said posts is a post of a first rack and the other post is a post of a second rack parallel to said first rack, wherein said first and second racks form a drive aisle for said trolley.

Thus, the trolley can climb and straddle the posts of two parallel and opposed racks, placed on each side of the traffic aisle.

According to a particularly advantageous aspect of the invention, said brackets are mounted substantially at two opposite ends of the frame of said trolley, along a diagonal line.

The mass of the trolley, whether loaded or not, is distributed on each side of a diagonal of the frame, which limits the overhang and reduces the forces exerted on the counter-wheels.

Preferably, a chain is secured to each of said posts and said notches are formed by the inner space of the links of said chains.

Advantageously, said chain is mounted at the bottom of the C-shaped rail forming the post.

The result is a ladder for climbing up and down the racks that is simple to implement and particularly easy to maintain, because it suffices, in case of localised wear of a notch, to change the link concerned. In addition, it is simpler and less expensive to change the chain rather than a full post when the wear is evenly distributed.

Advantageously, said toothed wheels or said notched belts are driven by independent motors.

Thus, the two toothed wheels of the two climbing means can rotate at different speeds chosen by the control unit, to maintain the trolley horizontally, in case of dimensional differences between the notches of the two posts.

According to a particular embodiment of the invention, said means for preventing tilting comprise four counter-wheels per bracket, axes orthogonal to the axes of the toothed wheels or notched belts, arranged in pairs and intended to roll on two lateral faces, separate from a post.

Thus, the trolley cannot tilt to one side or the other of the diagonal line connecting said two opposite ends of the frame.

Advantageously, said climbing means comprise at least one support wheel, of axis parallel to the axis of said toothed wheels or said notched belts, intended to roll on the outwardly facing side of the rack of one of said posts.

Thus, the lateral position of the trolley between the two racks is kept constant, which prevents the teeth of the toothed wheels or the notches of the belts from rubbing through the chain on the bottom of the C-profiled rail and limits the onset of a premature wear.

5. LIST OF FIGURES

Other features and advantages of the invention will become evident on reading the following description of two particular embodiments of the invention, given by way of illustrative and non-limiting example only, and with the appended drawings among which:

FIGS. 5A to 5D illustrate the successive steps performed by the post shown with reference to FIG. 2, to climb on two posts;

FIG. 6 is a detail view of FIG. 5C cantered on the climbing means of the trolley;

FIG. 7 is a schematic perspective view of another exemplary embodiment of an order picking system;

FIG. 8 is a schematic detail view of an alternative embodiment of the climbing means of the order picking system illustrated in FIG. 2;

FIG. 9 is a schematic perspective view of another exemplary embodiment of an order picking system according to the invention;

FIG. 10 is a top view of the trolley shown with reference to FIG. 9, climbing a rack;

FIG. 11 is a perspective view of the trolley shown with reference to FIG. 9 which begins a displacement on a rack level;

6. DETAILED DESCRIPTION OF THE INVENTION

Figure 1:
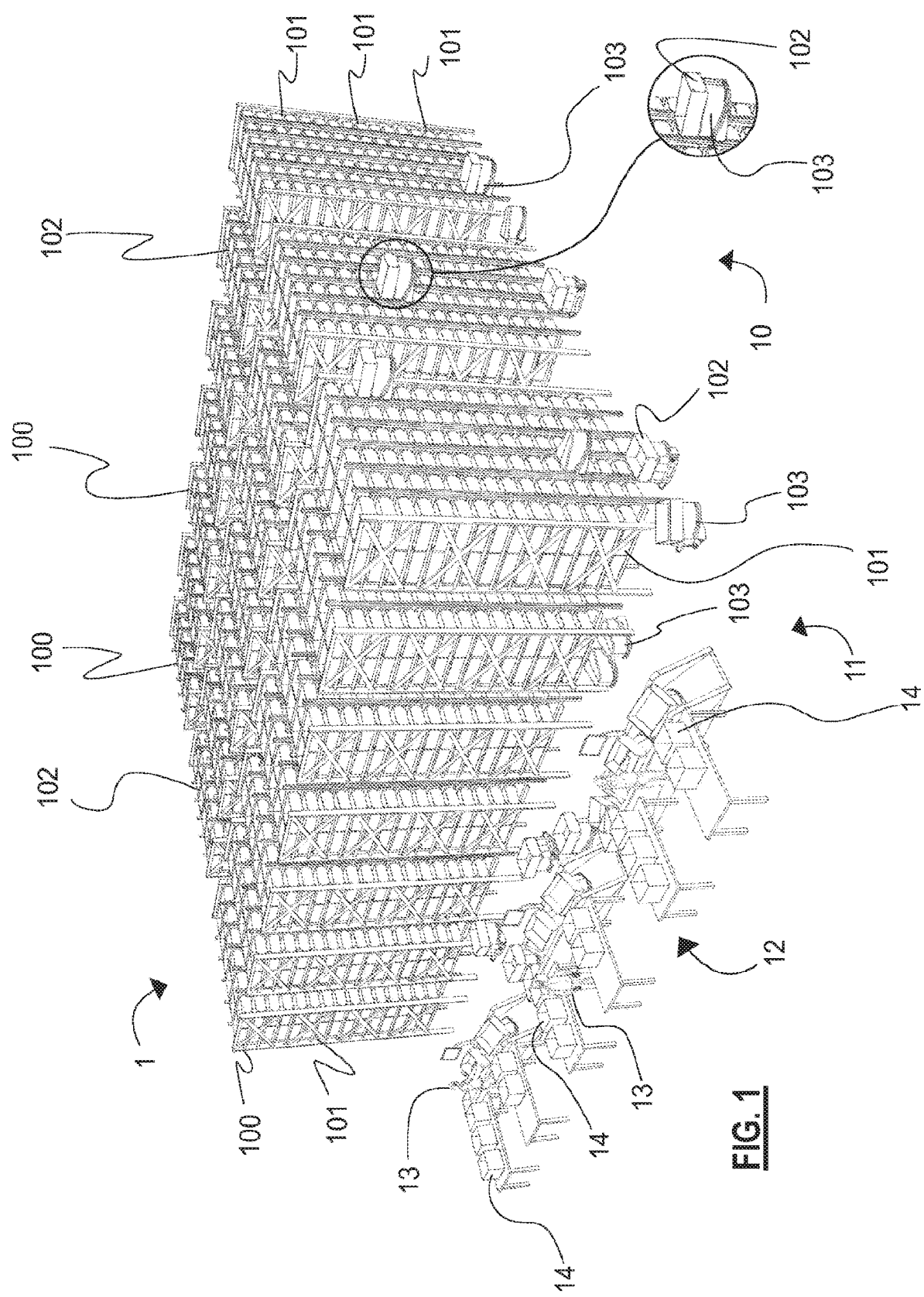
FIG. 1 is a schematic perspective view of a warehouse equipped with an exemplary embodiment of an order picking system.

6.1. First Exemplary Embodiment of the Invention

There is illustrated in FIG. 10 a warehouse equipped with identical 1000 racks arranged in parallel. The space between two racks 1000 forms a span 1001 which serves as a ground traffic aisle for robots 90. The frame of each rack 1000 comprises posts 1002 arranged at the head of spans and horizontal railings 1003 integral between each post 1002. These railings 1003 correspond to floors or levels 1004 for placing or storing the trays 102.

FIG. 9 schematically shows one of the self-guided trolleys 90, the frame 901 of which is mounted on four wheels 900 and is equipped with two climbing modules 91 and a plate 92 for transporting the containers 102. This robot 90 is equipped with a telescopic shovel not represented for handling the trays 102 transported on the plate 92.

The climbing modules 91 are each formed of a movable bracket which carries a toothed wheel 902, a guide roller 903 and a counter-wheel 904. These brackets are movable laterally relative to the frame 901 and can be spread on the side of the frame of the robot for climbing up posts 1002, or being retracted, when the robot 90 rolls on the floor or on railings 1003 of a rack 1000. When each movable bracket is in the spaced apart position, the toothed wheel 902, the guide roller 903 and the counter-wheel 904 laterally project out of the alignment of the frame so as to cooperate with the posts 1002 of two racks. Moreover, in the retracted position, the mobile brackets allow the robot 90 to cross the entrance of the aisle formed by the two posts 1002. In addition, it is noted that the axes of the two toothed wheels 902 are substantially orthogonal to the axes of the rolling drive wheels 900.

As can be seen in FIG. 10, the robot 90 can climb astride two racks 1000 disposed opposite each other on each side of the span 1001 with the aid of the posts 1002 present at the end of the span 1001. In this particular embodiment of the invention, the posts 1002 are U-shaped profiles whose perforated bottom serves as a ladder 1005 for the toothed wheels 902 of the robot 90. In addition, the robot 90 is retained by the roller and the counter-wheel of each bracket, resting on the posts 1002.

To start an ascent, the robot 90 aligns the climbing modules 91 and more particularly the toothed wheels 902 with the ladders 1005 of the posts 1002. Then, the robot 90 spreads the climbing modules 91 apart so that the toothed wheels 902 engage with the ladders 1005. Then it climbs the ladders 1005 up to the level 1004 where the tray 102 to be carried is stored.

As shown in FIG. 11, once arrived at level 1004, the robot 90 deploys its wheels 900 on the sides so that they rest on two railings 1003 opposite each other on the aisle. 1001. Next, the robot 90 retracts the two climbing modules 91 to release the posts 1002. The robot 90 can thus move longitudinally on the railings 1003 which support and serve as a guide or rolling path for the robot 90. When the robot 90 has reached the storage location of the desired tray 102, it aligns, removes the tray 102 on either of the two racks 1000, using the telescopic shovel.

Once in possession of the tray 102 to be conveyed, the robot 90 joins the end of the rack, to descend to the ground with the two climbing modules 91 locked to the posts 1002.

6.2. Second Exemplary Embodiment of the Invention

Figure 14:
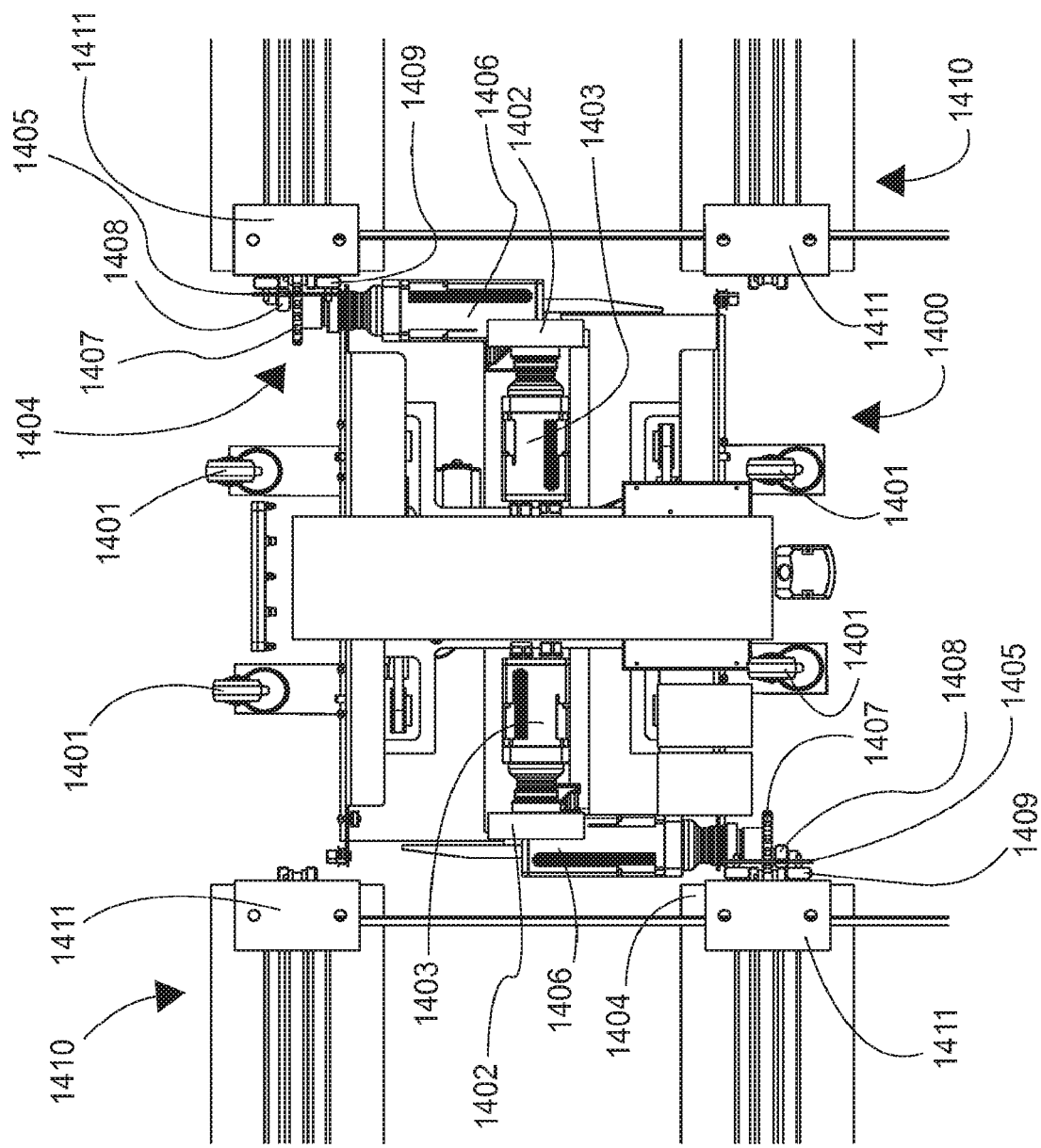
FIG. 14 is a view from below of another exemplary embodiment of an order picking system in accordance with the invention in which a trolley climbs in abutment on two parallel racks.

According to another exemplary embodiment of the invention illustrated in FIG. 14, a robot 1400 shown in bottom view is carried by four idler wheels 1401 and towed by two driving wheels 1402 actuated by motors 1403. Thus, on a substantially flat and horizontal floor, the self-guided trolley 1400 can follow rectilinear, curved paths and rotates around itself according to the rotational control of the motors. It moves in the warehouse, especially in aisles delineated by two substantially parallel racks 1410.

To climb 1410 up the racks, the frame of the robot 1400 is equipped, in a diagonal line of the frame, respectively at its rear-right end and at its front-left end, a retractable climbing module 1404 adapted to cooperate with a post 1411 of both racks 1410 delineating the aisle in which the robot 1400 is located. Each climbing module 1404 comprises a base 1405 which supports a motor 1406 actuating a toothed wheel 1407, a lateral bearing wheel 1408 and four counter-wheels 1409.

Figure 15:
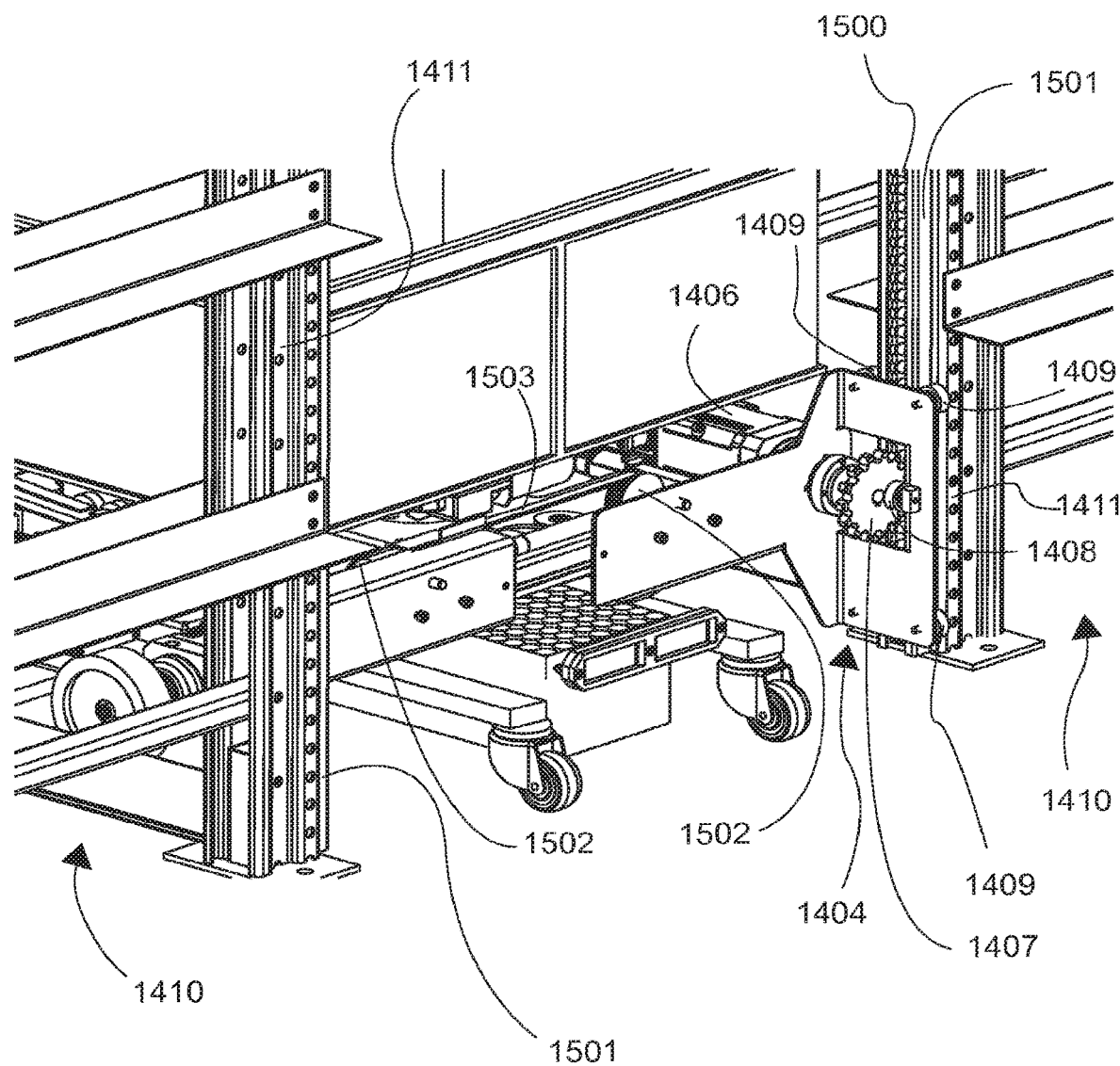
FIG. 15 is a side view of the trolley shown with reference to FIG. 14.

As can be seen in FIG. 15, which is a detailed perspective view of the retractable climbing module 1404 in the spaced apart position, the toothed wheel 1407 cooperates with the links of a roller chain 1500 held at the bottom of a C-profiled rail 1501 fixed to the post 1411 of the racks 1410.

Each engine 1406 is independently controlled by a motor shaft position control module (not shown in FIGS. 14 and 15), to ensure that the robot 1400 remains horizontal and that the load does not fall. Thus, the control module adjusts the speed of each motor 1406 to compensate for the spacing between the rolls of the chains fixed to each post, the length of which may vary during their manufacture, taking into account manufacturing tolerances.

It should be noted that, on posts of 10 to 12 m, equipped with chains of the same type, the position difference between the end rollers of the two chains can reach 20 mm.

In FIG. 15 it can also be seen that the robot 1400 comprises a translation system of the climbing module 1404 between a remote position and a retracted position. This translation system comprises two pulleys 1502 and a crenelated belt 1503 secured to the base 1405. To exit or retract the climbing module 1404, the driving pulley 1502 driven by a motor (not shown in FIG. 15), causes the crenelated belt 1503 which controls the translation of climbing module 1404.

The lateral support wheel 1408 serves as a stop in contact with the post 1411 during the exit of the climbing module 1404. This wheel thus guarantees the relative position of the toothed wheel 1407 with respect to the chain 1500 and the bottom of the C-profile 1501 and thus prevents the teeth of the toothed wheel 1407 rubbing at the bottom of the profile 1501.

It is therefore the direction of rotation of the stepping motor that allows the climbing module 1404 to be moved between the retracted position for the ground movements and the spread position to climb on the racks.

6.3. Another Exemplary Embodiment

In FIG. 1, there is illustrated a warehouse 1 for storing products for shipment. This warehouse is divided between a storage area 10 and an order picking area 11.

The order picking area 11 includes order picking stations 12 on which operators 13 prepare packages 14 with the products of an order.

The storage area 10 is organised in racks 100 with shelves on several levels 101, shelves on which are stored trays 102 which contain the products or items stored.

A fleet of automated guided trolleys 103 transports trays 102 between the storage area 10 and the order picking stations 12.

Each robot 103 receives the location information of the tray 102 containing the article to fetch, in order to complete a command processed by one of the operators 13. The robot 103 goes to the location where is stored the tray 102 and extracts it from the level 101 of the rack 100 specified by the received location information. Then, the robot 103 transports the tray 102 to the picking station 12. The operator 13 only needs to take the quantity of items ordered and pack them. The robot 103 then returns the tray 102 to its location in the storage area 10.

Figure 2:
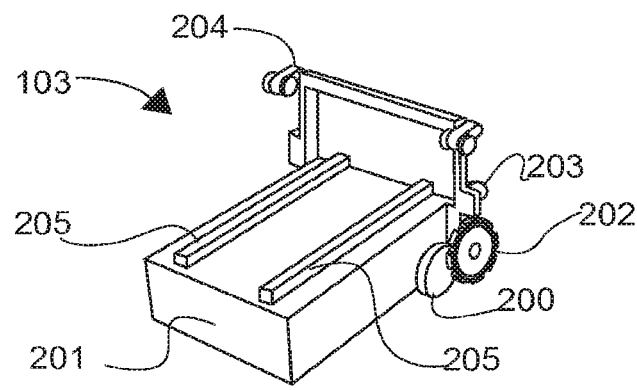
FIG. 2 is a diagrammatic perspective representation of an automated guided trolley used in the warehouse illustrated with reference to FIG. 1.

To roll on the ground, as shown in FIG. 2, the robot 103 is equipped with two independently motorised, front driving wheels 200 and an idler wheel at the rear (not shown in FIG. 2). This idler wheel ensures the stability and isostatism on the ground of the robot 103.

In variations of this particular embodiment, the robot can move on two wheels and pads or be equipped with several idler wheels.

Due to the independent motorisation of the wheels 200, the robot has a very small turning radius to perform, on a reduced surface, a 90 degree turn to align with a rack.

Note that the robots 103 are compact and lightweight. Their mass is in fact less than 30 kilograms.

In FIG. 2, it can be seen that the frame of the robot 103 is equipped with two toothed wheels 202 or climbing gears, two lateral guide rollers 203 and an anti-tilt device 204, which enable the robot to climb on a rack 100.

In this particular embodiment, the axes of the two toothed wheels 202 are substantially parallel to the axes of the drive wheels 200 and the axes of the guide rollers 203 are orthogonal to those of the toothed wheels 202.

Advantageously, the motors which independently actuate the two drive wheels 200 ensure the traction of the robot as it climbs, each driving a toothed wheel 202.

Figure 3:
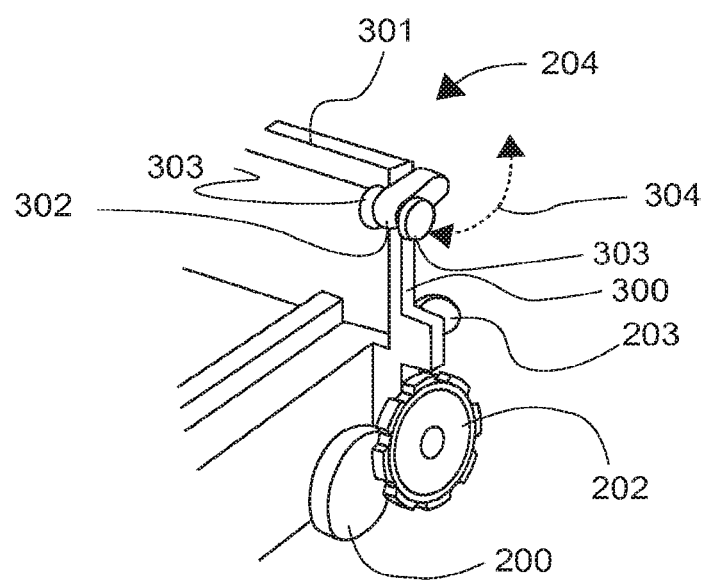
FIG. 3 is a detailed view of the climbing means of the trolley presented with reference to FIG. 2.

In the detailed view in FIG. 3, it can be seen that the anti-tilt device 204 comprises, substantially to the right of the two toothed wheels 202, two substantially vertical arms 300, which support at their distal ends a shaft 301 integral with the cams 302. A counter-wheel 303, free to rotate, is mounted at the end of each of the cams 302. It can also be seen that the axis of the counter-wheels 303 is parallel to the axis of the drive wheels 202.

Finally, the robot 103 comprises a telescopic shovel 205 in order to manipulate, that is to say ensure the gripping, of the tray 102. This telescopic shovel 205 is shown schematically in FIG. 2 in the transport position. Thus the robot 103 is able to take or remove the trays 102, regardless of the level 101 of the shelving rack 100.

As shown in FIG. 6 which is a detailed view of FIG. 5C, the rack 100 comprises two vertical posts 600 which serve as the raceway for the robot 103 during climbing. The posts 600 are obtained from a "C"-profiled rail, one face 601 of which comprises notches 602, or perforations, which form a ladder 603. The notches 602 regularly spaced by the value of the pitch of the toothed wheels 202 extend substantially perpendicularly to the longitudinal axis of the posts 600.

Figure 4:
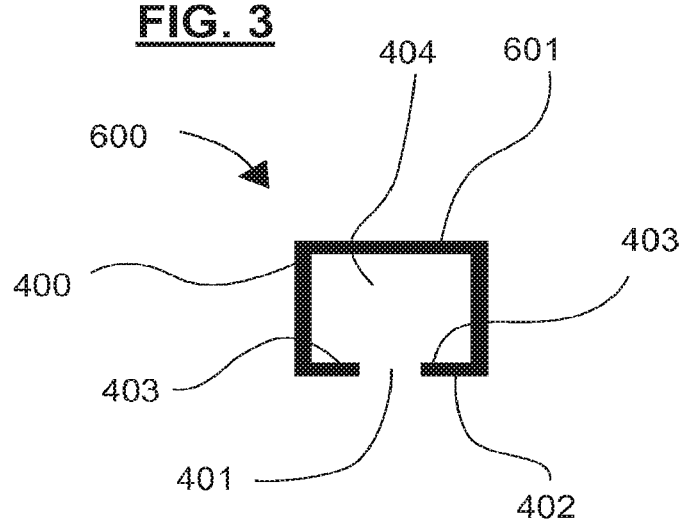
FIG. 4 is a sectional view of a profile used as a post for the racks illustrated with reference to FIG. 1.

As can be seen in FIG. 4, which is a cross-sectional view of a profiled rail used as the post for the racks, the profile 400 of the posts 600 is a C-profiled section, which has a slot 401 between two aisles 402 on the face opposite to the ladder 603. This slot 401 allows the toothed wheel 202 to reach the bottom of the profile 400 and to engage with the notches 602. The toothed wheel 202 and the ladder 603 thus cooperate in the manner of a rack and pinion mechanism.

In FIG. 4, it can also be seen that the folded wings 402 of the profile 400 form two holding surfaces 403, on both sides of the slot 204. These holding surfaces 403, opposite the ladder 603, are intended to serve as support and rolling surfaces for the counter-wheels 303, so as to resume the efforts corresponding to the weight of the robot 103 and its load, which are cantilevered, and to prevent the robot from rocking during climbing.

To allow the passage of the counter-wheels 303, the profile of the post 600 is hollowed out in its lower part, as can be seen in FIG. 6.

FIGS. 5A to 5D show the steps enabling the robot 103 to approach the rack 100 to climb on said rack so as to reach a tray 102 stored at the second level 101.

The robot 103 programmed to take the tray 102 from the second level 101 is first facing the rack 100 by being aligned with the posts 600 as shown in FIG. 5A. The robot 103 then advances until the teeth of the toothed wheels 202 enter the notches 602 of the ladders 603 of the posts 600, as shown in FIG. 5B.

Then, the counter-wheels 303 of the anti-tilt device 204 are introduced into the profile 400 as can be seen in FIG. 5C and the detailed view of FIG. 6. To do so, the shaft 301 rotates 304, which allows inserting the cams 302 in the slots 401 and engaging the counter-wheels 303 in an inner volume 404 of the posts 600.

Finally, the rotation of the toothed wheels 202 allows the robot 103 to climb on the posts 600 of the rack 100, while the counter-wheels 303 roll on the holding surfaces 403 of the posts 600, which maintain the balance of the robot 103 and prevent it from tipping.

During this ascent, the robot 103 is guided laterally in the post 600 by the lateral guide rollers 203.

When the robot arrives opposite the second level 101 (see FIG. 5D), the robot 103, using the telescopic shovel 205 schematically, grasps the tray 102 and brings it back to the frame 201, in a position of transport.

Down from the rack 100, the robot 103 when it reaches the ground, releases the anti-tilting device 204 of the posts 600 to deviate, then it rolls to the order picking area.

According to a variation, partially illustrated in FIG. 8, the robot is equipped with two crawlers 801 for climbing on posts 800, which engage on a rack and pinion system 802 formed of a thin stamped sheet housed in each of the posts. Note that the cavity of the rack and pinion system 802 is adapted to cooperate with the crawler 801, which reduces the noise generated during climbing.

In this FIG. 8, it is also noted that the crawler 801 is formed of a toothed belt driven by a first pulley and tensioned by a second idler pulley.

According to one variation, each crawler 801 cooperates with notches which form a ladder on a post of a rack.

Figure 13:
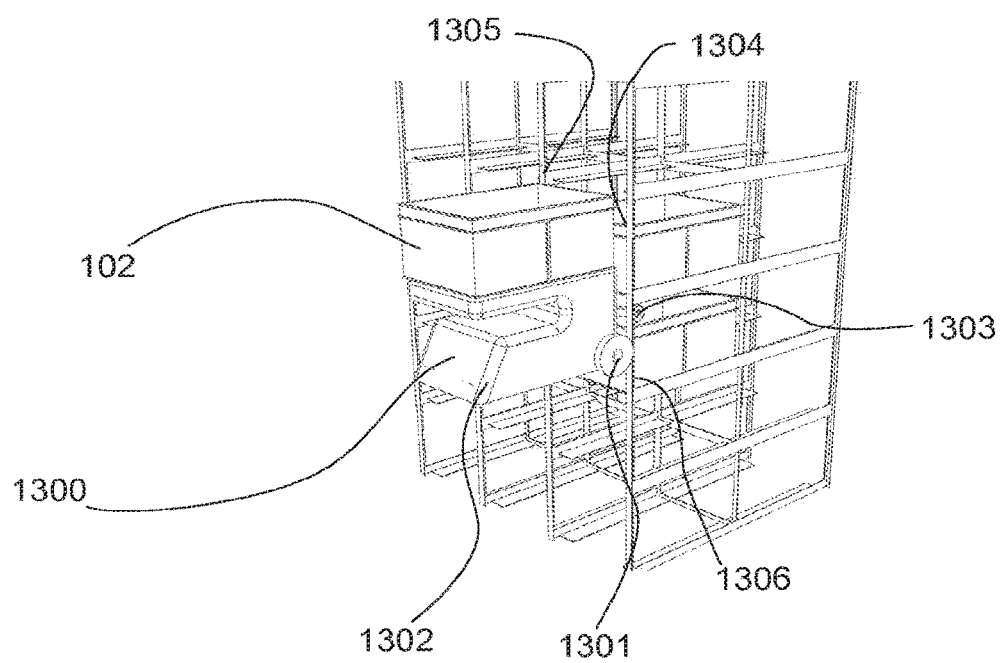
FIG. 13 is a schematic detail view of an alternative embodiment of the climbing means of the order picking system illustrated for reference purposes in FIG. 2.

According to another variation, with reference to FIG. 13, the robot 1300 is equipped with two drive wheels 1301 disposed at one end of the frame 1302 and with two removable counter-wheels 1303 at this same end.

On the ground, the drive wheels 1301 allow the robot 1300 to move. These same wheels 1301 allow the robot to climb on the posts 1305 of the racks.

During an ascent, these drive wheels 1301 are in contact with a front face 1304 of the sections forming the posts 1305, while the counter-wheels 1303 are folded on a rear face 1306 of the posts 1305. Advantageously, the tread of these wheels 1301 is slip-resistant or has spikes.

The weight of the robot 1300 which is cantilevered with respect to the drive wheels 1301 creates a bracing which produces the friction force allowing to climb up the post. Note that advantageously, the friction force increases with the weight of the robot 1300 and its load in the tray 102.

6.4. Another Exemplary Embodiment

According to another exemplary embodiment, the robot is equipped with two motorised drums 700, each mounted on one side of the robot frame. As can be seen in FIG. 7, each drum 700 is formed of two disks 701 held together by connecting rods 702. For climbing, the post 703 is a U-shaped profile equipped with a strap 704 whose one end is fixed to the top of the post 703 and has a hook 705 attached to its second end.

To climb up the post, the robot hooks a rod 702 from the drum to the hook 705 by initiating the rotation of the motor which causes the rotation of the drum 700. Next, the robot rises along the rack by winding the strap 704 around the drum 700, like a winch. To descend, it suffices to unroll the strap 704 around the drum.

During a vertical movement, the disks 701 of the drum 700 are guided laterally by the sides 706 of the post 703.

6.5. Another Exemplary Embodiment

Figure 12:
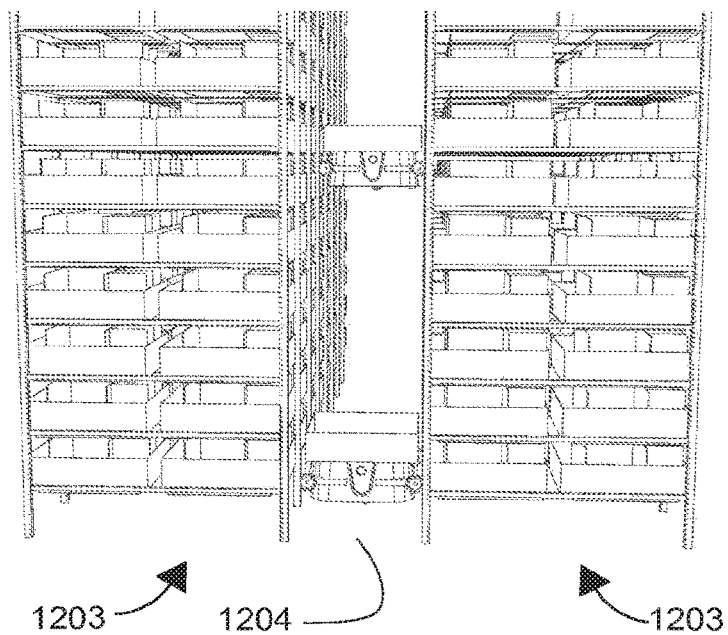
FIG. 12 is a perspective view of another exemplary embodiment of an order picking system in which a trolley climbs between two racks.

In another exemplary embodiment illustrated in FIG. 12, a robot 1200 is equipped at the four ends of a frame 1201 with two pairs of retractable toothed wheels 1202, each mounted on a movable axis.

As can be seen in FIG. 12, the robot 1200 can be mounted between two racks 1203 arranged in parallel and opposite each other on both sides of an aisle 1204, on which posts 1205, facing each other, identical to those presented with reference to FIGS. 4 and 6, are fixed.

To climb the racks 1203, the robot 1200, after aligning with the posts 1205, deploys the four toothed wheels 1202 by actuating the movable axes, which allows the toothed wheels 1202 to engage with the ladders of the four posts 1205. The rotation of the toothed wheels 1202 makes it possible to move the robot 1200 vertically, which can climb or descend along the posts.

It will be noted that, in this particular embodiment, the weight of the robot 1200 is distributed over the four posts 1205.

6.6. Other Optional Features and Advantages of the Invention

In variations of the embodiments of the invention detailed above, it may also be provided:

- To equip an automated guided trolley with two drive wheels cantered thereon, while two idler wheels are disposed peripherally and ensure the stability of the trolley. This geometry of the drive axles is then coupled with a balance system that ensures isostatism and distribute the weight of the robot and its load on all four wheels, regardless of soil imperfections;
- a braking device on the robot for the ascent and descent phases;
- automatic descent of the robot in case of anomaly, for example in the event of loss of electrical power. In this situation, the gripping tool is stored, the brakes are released, and the speed of descent to the ground is limited by exerting a magnetic field on the engine or means of climbing, so as to create a viscous brake;
- a location at altitude, by recognising the racks that support trays, by recognising the trays for example using an RFID chip (Radio Frequency Identification), or by the notches or indentations that form the climbing ladders;
- forks or a telescopic shovel on the robot to lift, translate and lower the tray, in which, the vertical movement of the robot enables to raise and lower the tray required for taking or removing it;
- telescopic side arms on the robot that can push and/or pull trays, sliding them on their shelf;
- an arm that pushes and/or pulls a tray from the front, sliding it on its shelf;
- a finger at the end of a telescopic fork that can push or pull a tray;
- to equip the trolley with a weighing scale of the trays that allows a continuous check of the inventory of the tray;
- climbing posts installed in the immediate vicinity of the racks, which allow the robot to move up and down along the racks, these posts being able to be fixed to the floor or to a rack
- a chain that replaces the notched ladders of the posts.

The examples of an order picking system described above can be used in different types of industrial environments, for example in an order picking logistics centre or in a spare parts supply chain or in a spare parts supply chain or components of a production line.

An exemplary embodiment of the present invention remedies the shortcomings of the state of the art mentioned above.

More specifically, an exemplary embodiment provides an order picking technique that limits human intervention and is simple to implement.

An exemplary embodiment provides an order picking technique which is inexpensive.

An exemplary embodiment provides an order picking technique that is compatible with a dense storage area.

An exemplary embodiment provides an order picking technique that can easily adapt to changes in the storage area.

An exemplary embodiment provides such a technique that allows to use racks with different heights and/or orientations in the same warehouse.

An exemplary embodiment provides an order picking technique for using existing racks.

An exemplary embodiment provides an order picking technique that is safe for operators working in the same warehouse.

Although the present disclosure has been described with reference to one or more examples, workers skilled in the art will recognize that changes may be made in form and detail without departing from the scope of the disclosure and/or the appended claims.

The invention claimed is:

1. An order picking system comprising:
   first and second posts secured to first and second separate racks, respectively;
   an automated guided trolley having a frame and at least two rolling wheels, for taking objects of an order in at least one of said racks; and
   motorised climbing modules adapted to cooperate with said first and second posts so as to allow said trolley to raise along said posts, said climbing modules comprising two and only two brackets and comprising two and two only two toothed wheels and/or two and only two notched belts of substantially parallel axes, each intended to cooperate with one of said first and second posts, the axes of the toothed wheels and/or the axes of pulleys that drive said notched belts being substantially orthogonal to the axes of the rolling wheels,
   each of said first and second posts having a plurality of notches extending substantially perpendicularly to the longitudinal axis of said post, to accommodate teeth of said toothed wheel or of said notched belt cooperating with said post and spaced by the value of a pitch of said toothed wheel or said notched belt,
   each of the toothed wheels or notched belts being mounted on one of the brackets, the bracket being movable relative to the frame of said trolley between two positions:
     a spaced apart position in which at least one portion of said toothed wheel or said notched belt mounted on said bracket projects laterally out of alignment with said frame; and
     a retracted position, in which the toothed wheel or the notched belt mounted on said bracket is opposite said frame,
     wherein said brackets are mounted substantially at two opposite ends of the frame of said trolley, along a diagonal,
   said climbing modules each comprising an anti-tilt device, which prevents tilting of said trolley and comprises at least one counter-wheel to roll on one of said posts, mounted on one of said brackets.

2. The order picking system according to claim 1, wherein each of said posts is a C-profiled rail.

3. The order picking system according to claim 1, wherein each of said posts is an upright of said rack.

4. The order picking system according to claim 1, further comprising means for fastening said post to said rack.

5. The order picking system according to claim 1, wherein said trolley has a gripping tool for gripping from an object storage box.

6. The order picking system according to claim 1, wherein at least one of said rolling wheels and said motorised climbing modules are driven by the same motor.

7. The order picking system according to claim 1, further comprising a brake for braking at least one of said climbing modules.

8. The order picking system according to claim 1, wherein one of said posts is a post of a first rack and the other is a post of a second rack parallel to said first rack, said first and second racks defining a drive aisle for said trolley.

9. The order picking system according to claim 1, further comprising a respective chain secured to each of said posts, wherein said notches are formed by an interior space of links of said chains.

* * * * *